United States Patent [19]

Taylor

[11] Patent Number: 5,817,263
[45] Date of Patent: Oct. 6, 1998

[54] END FLOW FILTER AND METHOD OF MAKING SAME

[75] Inventor: Roy M. Taylor, Rockford, Mich.

[73] Assignee: Amway Corporation, Ada, Mich.

[21] Appl. No.: 704,939

[22] Filed: Aug. 30, 1996

[51] Int. Cl.⁶ .................................................. B29C 67/20
[52] U.S. Cl. .................... 264/113; 264/126; 264/DIG. 48
[58] Field of Search ..................................... 264/109, 112, 264/113, 122, 123, 125, 126, DIG. 48

[56] References Cited

U.S. PATENT DOCUMENTS

| | | |
|---|---|---|
| 2,882,243 | 4/1959 | Milton . |
| 3,048,537 | 8/1962 | Pall et al. . |
| 3,164,506 | 1/1965 | Lake . |
| 3,183,286 | 5/1965 | Harms . |
| 3,211,605 | 10/1965 | Spaak et al. . |
| 3,259,677 | 7/1966 | Zwick . |
| 3,293,205 | 12/1966 | Doyle et al. . |
| 3,297,805 | 1/1967 | Rottig et al. . |
| 3,300,329 | 1/1967 | Orsino et al. . |
| 3,354,012 | 11/1967 | Forman et al. . |
| 3,367,807 | 2/1968 | Feldman . |
| 3,434,336 | 3/1969 | Harr . |
| 3,439,809 | 4/1969 | McPherren . |
| 3,440,108 | 4/1969 | Hefftner . |
| 3,444,278 | 5/1969 | Ozolins . |
| 3,449,054 | 6/1969 | Lundsager . |
| 3,469,706 | 9/1969 | Kissell . |
| 3,474,600 | 10/1969 | Tobias . |
| 3,529,726 | 9/1970 | Keenan . |
| 3,554,377 | 1/1971 | Miller . |
| 3,562,895 | 2/1971 | Niebergall et al. . |
| 3,611,678 | 10/1971 | Holden . |
| 3,627,864 | 12/1971 | Doubleday . |
| 3,680,287 | 8/1972 | Wood, III et al. . |
| 3,705,651 | 12/1972 | Klein . |
| 3,715,035 | 2/1973 | Teeple, Jr. et al. . |
| 3,715,869 | 2/1973 | Holden . |
| 3,753,500 | 8/1973 | Voegeli .................................... 210/496 |
| 3,842,006 | 10/1974 | Burt . |
| 3,853,501 | 12/1974 | Stringer . |
| 3,909,402 | 9/1975 | Gartner . |
| 3,919,369 | 11/1975 | Holden . |
| 3,951,798 | 4/1976 | Haldopoulos . |
| 3,971,839 | 7/1976 | Taylor . |
| 4,078,030 | 3/1978 | Munk et al. . |
| 4,102,966 | 7/1978 | Duperray et al. . |
| 4,113,627 | 9/1978 | Leason . |
| 4,120,711 | 10/1978 | Gudeman . |
| 4,196,081 | 4/1980 | Pavia . |
| 4,203,851 | 5/1980 | Ramachandran . |
| 4,229,306 | 10/1980 | Hein et al. . |
| 4,230,593 | 10/1980 | Wagner, III et al. . |
| 4,242,201 | 12/1980 | Stephens et al. . |
| 4,253,954 | 3/1981 | Midkiff et al. . |
| 4,267,237 | 5/1981 | Duperray et al. . |
| 4,271,015 | 6/1981 | Moore . |
| 4,294,594 | 10/1981 | Sloane, Jr. et al. . |
| 4,298,475 | 11/1981 | Gartner . |
| 4,305,826 | 12/1981 | Moses . |
| 4,311,609 | 1/1982 | Wagner, III et al. . |
| 4,336,036 | 6/1982 | Leeke et al. . |
| 4,351,869 | 9/1982 | Cresap . |
| 4,368,123 | 1/1983 | Stanley . |
| 4,373,887 | 2/1983 | Hanson et al. . |
| 4,396,572 | 8/1983 | Batigne et al. . |

(List continued on next page.)

FOREIGN PATENT DOCUMENTS 54-34475   3/1979   Japan .
976257   11/1964   United Kingdom ................... 264/122

*Primary Examiner*—Matthew O. Savage
*Attorney, Agent, or Firm*—Sean M. Sullivan; Brinks Hofer Gilson & Lione

[57] ABSTRACT

An integrated filter and sleeve assembly has an annular non-porous sleeve having opposing open ends and an outer circumferential wall with an inner surface. The integrated filter and sleeve assembly also has a filtration block disposed within the annular sleeve between the open ends. The filtration block includes a mixture of filtration media and a binder. A seal is formed between the inner surface and the filtration block by applying heat to the annular non-porous sleeve and the filtration block.

40 Claims, 1 Drawing Sheet

U.S. PATENT DOCUMENTS

| | | |
|---|---|---|
| 4,406,786 | 9/1983 | Hein . |
| 4,414,172 | 11/1983 | Leason . |
| 4,438,057 | 3/1984 | Sundseth . |
| 4,444,661 | 4/1984 | Jackson et al. . |
| 4,460,530 | 7/1984 | Hanson et al. . |
| 4,464,263 | 8/1984 | Brownell . |
| 4,490,321 | 12/1984 | Klinkau . |
| 4,529,419 | 7/1985 | Perl et al. . |
| 4,561,979 | 12/1985 | Harms et al. . |
| 4,578,187 | 3/1986 | Alhauser . |
| 4,619,948 | 10/1986 | Kennedy et al. . |
| 4,635,663 | 1/1987 | Rollins et al. . |
| 4,652,367 | 3/1987 | Reulecke et al. . |
| 4,664,683 | 5/1987 | Degen et al. . |
| 4,665,050 | 5/1987 | Degen et al. . |
| 4,684,471 | 8/1987 | Manojlovic . |
| 4,689,147 | 8/1987 | Leoncavallo et al. . |
| 4,725,323 | 2/1988 | Ostreicher et al. . |
| 4,731,184 | 3/1988 | Ostreicher et al. . |
| 4,741,828 | 5/1988 | Alhauser et al. . |
| 4,744,902 | 5/1988 | Taki et al. . |
| 4,753,728 | 6/1988 | VanderBilt et al. . |
| 4,859,386 | 8/1989 | VanderBilt et al. . |
| 4,889,630 | 12/1989 | Reinhardt et al. . |
| 4,963,261 | 10/1990 | Witkowski et al. . |
| 5,017,318 | 5/1991 | Vanderbilt et al. . |
| 5,064,534 | 11/1991 | Busch et al. . |

END FLOW FILTER AND METHOD OF MAKING SAME

FIELD OF THE INVENTION

The present invention relates to an end flow filter and, in particular, an end flow water filter having reduced wall effect, and to a method of making a reduced wall effect end flow water filter.

BACKGROUND OF THE INVENTION

Generally, end flow filters have been made with a filter medium such as a cylindrical block of bonded, activated charcoal. In such filters, a fluid such as water flows into one end of the filter, through the filter medium, and out the other end of the filter. After the water flows through the filter medium, many impurities are removed from the water. Typically, some type of enclosure or housing, in the form of a plastic sleeve, is positioned around the filter medium to retain the filter medium and direct fluid flow through it. In addition, the sleeve may prevent water from flowing out the sides of the filter.

One problem with the prior art end flow filters is that they tend to allow what is known as wall effect. Wall effect occurs when a fluid such as water initially flows into the filter enclosure, but then flows out to and around the filter medium between the medium and the enclosure surrounding the medium. This problem is particularly prevalent when the particle size of the filter media is relatively large compared to the cross-sectional area of the filter enclosure. In this arrangement, some percentage of water flows around, rather than through, the filter medium and is not properly filtered. Thus, the elimination or reduction of wall effect in end flow filters is desirable in order to properly filter a fluid such as water flowing through the filter medium.

Another problem with prior art end flow filters is that several steps are often required to manufacture the filters. For example, the manufacture of a typical end flow filter may involve mixing a binder with a filtration medium, applying heat and pressure to the mixture to form a filter block, applying a sealing cement to the outside of the filter block, and placing the filter block with sealing cement on its outer surface inside a plastic sleeve to form the filter. Applying sealing cement to the outside of the filter block to form a bond between the block and the plastic sleeve requires a separate manufacturing step which can increase both the time and the expense of manufacturing the end flow filter.

Accordingly, there are several advantages that are lacking in the prior art end flow filters. For instance, the prior art end flow filters do not have a seal between the filter medium and the outer sleeve that is effective enough to reduce wall effects. The prior art end flow filters also do not employ a single manufacturing step for forming a seal between the block and the outer sleeve at the same time the filter block is formed.

SUMMARY OF THE INVENTION

In view of the above, the present invention provides a system and method for an integrated end flow filter and sleeve assembly. The integrated filter and sleeve assembly comprises an annular non-porous sleeve having opposing open ends and an outer circumferential wall with an inner surface. The integrated filter and sleeve assembly also comprises a filtration block disposed within the annular sleeve between the open ends. A seal is formed between the inner surface and the filtration block by the application of heat.

According to the method of the present invention, an integrated end flow filter and sleeve assembly is formed by defining a configuration of a filter with a mold and placing a non-porous sleeve into the mold. The sleeve is filled with a mixture of filtration media and binder, and heat is applied to the mold, the sleeve, and the mixture, simultaneously, to provide an integrated filter and sleeve assembly.

As a result, the present invention provides an integrated filter and sleeve assembly that is an improvement over the prior art end flow filters and overcomes the previously mentioned disadvantages associated with these filters. In particular, the integrated filter and sleeve assembly of the present invention provides an improved seal between the filtration block and the outer sleeve which is effective in reducing wall effect. Additionally, the sleeve of the integrated filter and sleeve assembly of the present invention is sealed to the filtration block at the same time the filtration block is formed, thereby eliminating the separate manufacturing step of applying sealing cement to the outside of the filter medium after the medium is formed.

These and other features and advantages of the invention will become apparent to those skilled in the art upon a review of the following detailed description of the presently preferred embodiments of the invention, taken in conjunction with the appended drawings.

DETAILED DESCRIPTION OF THE PRESENTLY PREFERRED EMBODIMENTS

Figure 1:
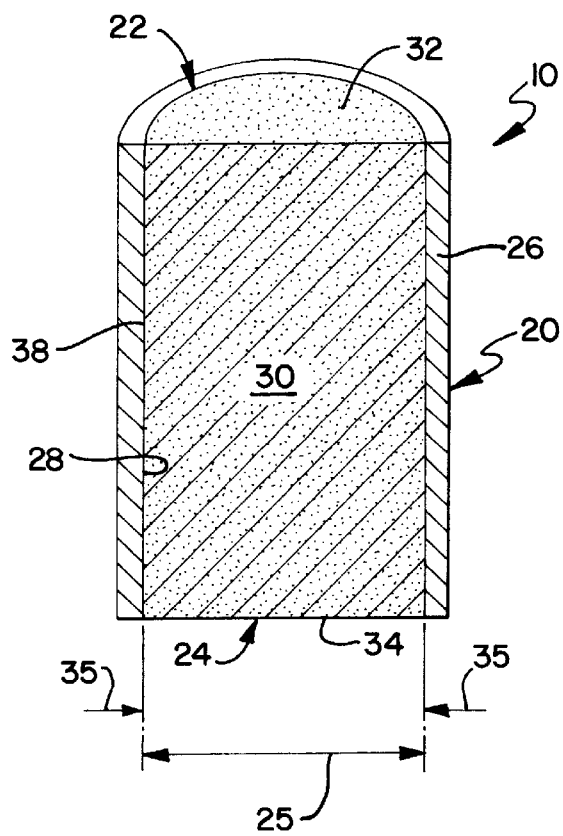
FIG. 1 is a perspective view, partially in section, of an integrated filter and sleeve assembly formed according to the present invention.

Turning now to the drawings, FIG. 1 shows a vertical cross-section of the preferred embodiment of the integrated filter and sleeve assembly of the present invention. The integrated filter and sleeve assembly 10 comprises an annular non-porous sleeve 20 and a filtration block 30.

The annular non-porous sleeve 20 has a first open end 22 and a second open end 24 spaced from the first open end. The sleeve also has an inner diameter 25 and an outer circumferential wall 26 with an inner surface 28, as shown in FIG. 1. The sleeve is preferably formed from a thermoplastic polymer, and in particular, a polyolefin. The sleeve may also be made out of either polypropylene or polyethylene, or a combination of both polypropylene and polyethylene.

The annular non-porous sleeve 20 may take any shape or configuration suitable for a particular purpose. Preferably, the sleeve comprises a pre-formed cylindrical extrusion tube that is cut to the length of a mold 40 (see FIG. 2) used in the method of making the integrated filter and sleeve assembly 10. Alternatively, the sleeve 20 may comprise a sheet that is rolled into a cylindrical shape and has two edges that overlap each other. The edges of the sheet overlap to form a seal between the two edges of the sheet when the sleeve is eventually heated and sealed together.

The outer circumferential wall 26 of the annular non-porous sleeve 20 may also take any length, diameter, and thickness, depending on consumer and manufacturing preferences. Preferably, however, the outer wall has a length of about 1 to about 2 inches and has a diameter of about 4 inches. There is no maximum thickness for the outer wall, but it should have a thickness greater than 0.020 inches to prevent defects and holes which may occur during the application of heat or pressure. Preferably, the outer circumferential wall of the sleeve has a thickness of about 0.040 to about 0.060 inches, and most preferably about 0.040 inches.

The filtration block 30 is disposed between the first and second open ends 22, 24 of the annular non-porous sleeve 20. The filtration block 30 has a first end 32 and a second end 34 longitudinally spaced from the first end 32. The first and second ends 32, 34 of the filtration block correspond to the first and second open ends 22, 24 of the sleeve, respectively. The filtration block 30 also has an outer diameter 35 and an outer surface 38 disposed opposite the inner surface 28 of the outer circumferential wall 26. The outer surface 38 of the filtration block is bonded to the inner surface 28 of the outer circumferential wall 26 by applying heat to both the filtration block and the sleeve. As a result of the method described below, the inner surface 28 of the sleeve wall 26 conforms to the filtration block 30, thus reducing or eliminating any gaps or spaces between the sleeve and the filtration block. Preferably, the filtration block has a density in the range of about 0.55 to about 0.62 grams per cubic centimeter.

The filtration block 30 preferably comprises a mixture of filtration media and a binder. The filtration media may include any filtering substance that is compatible with the binder used. Ideally, the preferred binder is capable of surviving temperatures in the range of 350 to 400 degrees Fahrenheit. Other binders and filtration media may also be used which operate or cure in other temperature ranges. The binder ideally includes thermoplastic polymers having a sufficiently low melt index to become tacky at elevated temperatures in the range of 350 to 400 degrees Fahrenheit without become sufficiently liquid to coat the filtration media. Examples of both suitable filtration media and a suitable binder for the filtration block of the present invention are disclosed in VanderBilt et al., U.S. Pat. No. 4,753, 728, the contents of which are hereby specifically incorporated herein by reference.

In the preferred embodiment of the present invention, carbon particles are used for the filtration media in the filtration block. These carbon particles comprise a single layer of 12 to 325 mesh screen powdered carbon. One commercially available 12 to 325 mesh carbon for the filtration media is CALGON TOG-C manufactured by Calgon Carbon Corporation of Pittsburgh, Pa. Activated carbons are produced and identified according to their mesh size. For instance, in a 12 to 325 mesh carbon, the particles are of a size such that 90 to 95 percent of the carbon will pass through a 12 mesh screen but remain on a 325 mesh screen. All mesh screen numbers used herein refer to U.S. Sieve series screens.

Quite often, defining the screen size for a layer of carbon particles can be difficult due to the presence of "fines." Such fines are extremely small particles which will pass through any practical screen. These may comprise as much as 20% by weight of the carbon particles used and are often disregarded by the producers of the carbon particles themselves in grading their carbon particles. The screen grading referred to herein also disregards the presence of fines.

Instead of a single layer of carbon particles for the filtration media, the filtration media may be alternatively broken up into two or more layers of different sized carbon particles. For example, a course layer of large carbon particles ranging in size from about 12 mesh to about 50 mesh may be positioned on a fine layer of small carbon particles ranging in size from about 100 mesh to about 325 mesh. Alternatively, the filtration media may include alternating layers of these course and fine layers of carbon particles. An intermediate layer of medium carbon particles ranging in size from about 50 mesh to about 100 mesh may also be positioned between the course and fine layers of carbon particles. Although carbon particles are preferred for the filtration medium, alternate filtration media that are also suitable for the filtration block of the present invention include manganese green sand, activated alumina, synthetic ion exchange resin beads, sand, and/or gravel.

In the preferred embodiment of the present invention, an ultra high molecular weight polyethylene is used for the thermoplastic binder in the filtration block. Such polyethylenes have a molecular weight of from about 4 million to about 6 million. They also have a vicat softening point of approximately 74 degrees Celsius and a crystalline melting range of 135 to 138 degrees Celsius. The preferable commercially available ultra high molecular weight polyethylene for the binder of the present invention is HOSTALEN GUR-212 sold by Hoechst Celanese Corporation of League City, Tex. This binder has a density of 0.935 grams per cubic centimeter and a melt index of less than 0.1 grams per ten minutes as determined by DIN 53735 at 190/15.

The integrated filter and sleeve assembly of the present invention operates in the following manner. First, water enters the first end 32 of the filtration block 30 and proceeds to flow through the filtration block toward its second end 34. As water passes through the filtration block, it is filtered by the filtration media. Since the inner surface of the outer circumferential wall of the sleeve is heat sealed and melted to the filtration block, there are little or no spaces or gaps between the sleeve and the filtration block. As a result, the water flowing through the filtration block is directed to flow through the filtration block. Thus, the water entering the first end of the filtration block flows through the entire filtration block and is thus properly filtered. In other words, wall effect is reduced by the heat sealing and melting of the sleeve to the filtration block. After flowing through the entire filtration block, the water finally exits out of the second end 34 of the filtration block and is capable of consumption or ready for other uses.

Figure 2:
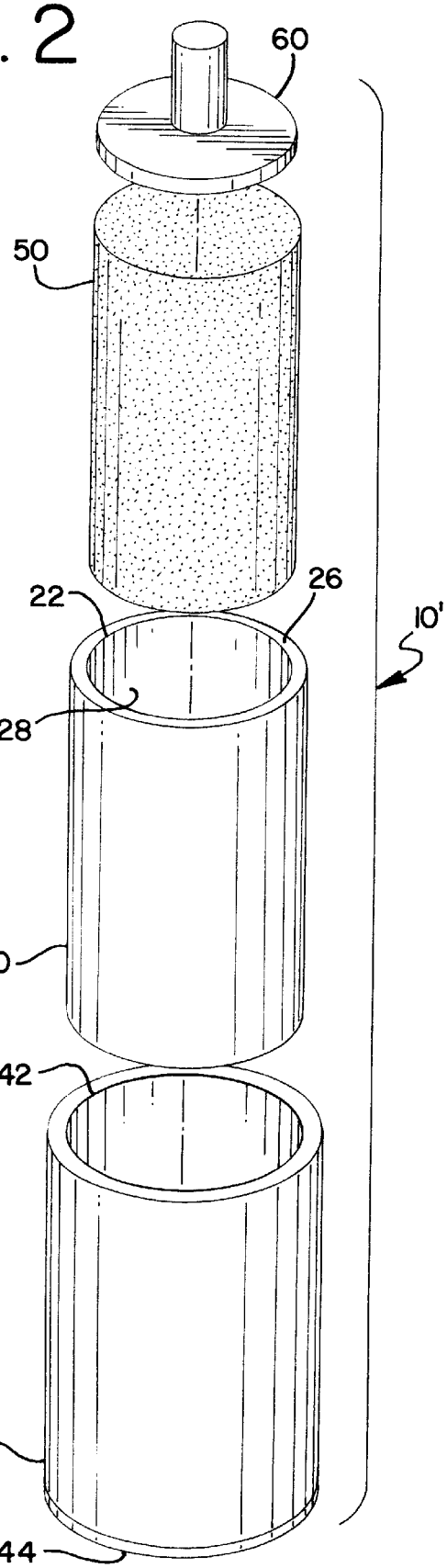
FIG. 2 is an exploded, perspective view of the integrated filter and sleeve assembly of FIG. 1.

Turning now to FIG. 2, a method of making the previously described integrated filter and sleeve assembly will be discussed. First, a mold 40 is provided having a configuration that corresponds to the configuration of the desired end flow filter. Preferably, the mold 40 is made out of aluminum and has an overall cylindrical shape with an opening 42 and an opposing closed end 44. Opening 42 is adapted to receive the non-porous sleeve 20, the filtration media, and the binder. The opening 42 has a diameter that is slightly greater than the diameter of the outer circumferential wall 26 of the sleeve 20, which is preferably about 4 inches. Moreover, the mold 40 has an overall length equal to or greater than the length of the outer circumferential wall 26 of the sleeve 20 which is preferably about 1 to about 2 inches.

According to the method, the annular non-porous sleeve 20 is placed inside the mold 40 through its opening 42. Shortly thereafter, the filtration media is mixed together with the binder to form a mixture 50 of filtration media and binder. This mixture is then poured into the sleeve which is already situated in the mold 40.

After the sleeve 20 has been filled with the mixture 50, heat is applied to the mold 40, the sleeve 20 disposed inside the mold 40, and the mixture 50 disposed inside the sleeve, simultaneously. The preferred heating method is placing a filter and sleeve assembly 10' in an oven. Other possible heating methods include the use of radiant heat, induction heating and the like. The amount of heat applied to these elements depends on the filtration media and the binder used for the mixture. In the preferred embodiment discussed above involving carbon particles as the filtration media and ultra high molecular weight polyethylene as the binder, the mold, the sleeve, and the mixture are heated together to a temperature of about 350 to about 400 degrees Fahrenheit until the internal temperature of the mixture reaches from about 350 to about 375 degrees Fahrenheit. A thermocouple (not shown) may be positioned within the mixture to monitor and determine the internal temperature of the mixture.

Heating the mixture and sleeve inside the mold allows the mixture to form the filtration block 30 (discussed above), and the sleeve becomes heat sealed to the outer surface of the filtration block, simultaneously. As a result, the manufacturing steps of first forming the filtration block from the mixture, then applying a sealing cement to the outer surface of the filtration block, and finally positioning the block with sealing cement on its outer surface inside of the plastic sleeve, are reduced to a single step. In the method of the present invention, the mixture is formed into the filtration block and the sleeve is sealed to the filtration block within a single step.

Once the mold, the sleeve, and the mixture have been sufficiently heated, preferably a compression piston 60 is lowered toward the opening of the mold to apply pressure to the mixture. The compression piston 60 preferably has a diameter that is smaller than the inner diameter 25 of the sleeve. As a result, only the mixture is subjected to pressure by the piston. Preferably, the piston applies pressure to the mixture in the range of about 10 to about 40 p.s.i. until the density of the mixture is in the range of 0.55 to 0.62 grams per cubic centimeter.

Applying pressure to the mixture while its in the mold enhances the sealing and bonding between the mixture and the sleeve. Accordingly, any spaces or gaps which would not be eliminated by only heat sealing the sleeve to the mixture are likely to be eliminated by applying compressive pressure to the mixture in the sleeve. However, filters can be made without pressure and the process works well but the density is significantly lower and outside the preferred range. After the heat and pressure steps have been performed, the integrated filter and sleeve assembly is cooled and removed from the mold. Any undesirable excess of the sleeve may be removed by trimming the sleeve, and the integrated filter and sleeve assembly is now ready for use as an end flow filter.

Further, it is possible to practice this invention using a pressure sensitive wax as a binder. In this case, the application of pressure alone can be used to bind the filter medium, sleeve and binder together. Also, it is within the scope of this invention to use various layers of discrete filter media such as carbon particles, activated alumina, manganese green sand and the like.

The present invention can be applied with particular advantage to end flow water filters. Of course, it is readily apparent that the present invention can also be utilized as an end flow filter for filtering other fluids such as gases and liquids. In addition, it is also apparent that, depending on consumer and manufacturing preferences, the filtration media for the present invention may be any suitable media for filtering the desired fluid, and the shape and size of the filter may be of any geometrical configuration.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, defined by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A method of forming an integrated filter and sleeve assembly, comprising the steps of:
   providing a non-porous sleeve;
   providing a mold;
   providing a mixture of particulate filtration media and a thermoplastic binder; filling the sleeve with the mixture; and
   applying one of at least heat and pressure to the sleeve and the mixture to form a bond between adjacent particles of filtration media and to form a bond between an interior surface of the sleeve and particles of filtration media adjacent to the sleeve.

2. The method of claim 1 wherein both heat and pressure are applied to the sleeve and mixture to form the bond.

3. The method of claim 1 further comprising the step of mixing filtration media with a binder to form a mixture.

4. The method of claim 1 further comprising the step of forming the sleeve from a thermoplastic polymer.

5. The method of claim 4 further comprising the step of forming the sleeve from a polyolefin.

6. The method of claim 5 further comprising the step of forming the sleeve from polypropylene.

7. The method of claim 5 further comprising the step of forming the sleeve from polyethylene.

8. The method of claim 4 further comprising the step of forming the sleeve by rolling a thermoplastic polymer sheet into a cylindrical shape with overlapping edges.

9. The method of claim 4 further comprising the step of forming the sleeve by cutting a pre-formed thermoplastic polymer extrusion tube to the length of the mold.

10. The method of claim 1 further comprising the step of forming the filtration media from carbon particles.

11. The method of claim 10 further comprising the step of forming the filtration media from carbon particles ranging in size from about 12 mesh to about 325 mesh.

12. The method of claim 11 further comprising the steps of filling one-half of the sleeve with small carbon particles ranging in size from about 100 mesh to about 325 mesh and filling the other one-half of the sleeve with large carbon particles ranging in size from about 12 mesh to about 50 mesh.

13. The method of claim 11 further comprising the step of filling the sleeve with alternating layer of small carbon particles ranging in size from about 100 mesh to about 325 mesh and large carbon particles ranging in size from about 12 mesh to about 50 mesh.

14. The method of claim 11 further comprising the steps of filling one-third of the sleeve with small carbon particles ranging in size from about 100 mesh to about 325 mesh, filling one-third of the sleeve with medium sized carbon particles ranging in size from about 50 mesh to about 100 mesh, and filling the remaining one-third of the sleeve with large carbon particles ranging in size from about 12 mesh to about 50 mesh.

15. The method of claim 1 wherein heat is applied to the sleeve and mixture to form the bond.

16. The method of claim 1 further comprising the step of heating the mold, the sleeve, and the mixture in the range of 350 degrees Fahrenheit to 400 degrees Fahrenheit.

17. The method of claim 16 further comprising the step of heating the mold, the sleeve, and the mixture until the mixture reaches an internal temperature in the range of 350 degrees Fahrenheit to 375 degrees Fahrenheit.

18. The method of claim 1 further comprising the step of applying pressure to the mixture.

19. The method of claim 18 further comprising the step of applying pressure to the mixture in the range of about 10 p.s.i. to about 40 p.s.i. with a piston having a diameter smaller than an inner diameter of the sleeve.

20. The method of claim 18 further comprising the step of compressing the mixture after heating to a density in the range of 0.55 g/cc to 0.62 g/cc.

21. The method of claim 1 further comprising the step of using a sleeve having a sleeve wall with a thickness in the range of 0.020 inch to 0.060 inch.

22. The method of claim 1 further comprising the step of using a sleeve having a sleeve wall with a thickness of 0.040 inch.

23. The method of claim 1 further comprising the step of forming the filtration media from activated alumina.

24. The method of claim 1 further comprising the step of forming the filtration media from manganese green sand.

25. The method of claim 1 further comprising the step of forming the filtration media from synthetic ion exchange resin beads.

26. A method of forming an integrated filter and sleeve assembly, comprising the steps of:

providing a non-porous sleeve;

providing a mixture of particulate filtration media and a thermoplastic binder;

filling the sleeve with the mixture; and applying one of at least heat and pressure to the sleeve and the mixture to form a bond between adjacent particles of filtration media and to form a bond between an interior surface of the sleeve and particles of filtration media adjacent to the sleeve.

27. The method of claim 26 further comprising the step of mixing filtration media with a binder to form a mixture.

28. The method of claim 26 further comprising the step of forming the sleeve from a thermoplastic polymer.

29. The method of claim 28 further comprising the step of forming the sleeve from polypropylene.

30. The method of claim 28 further comprising the step of forming the sleeve by rolling a thermoplastic polymer sheet into a cylindrical shape with overlapping edges.

31. The method of claim 28 further comprising the step of forming the sleeve from a pre-formed thermoplastic polymer extrusion tube.

32. The method of claim 26 further comprising the step of heating the mold, the sleeve, and the mixture in the range of 350 degrees Fahrenheit to 400 degrees Fahrenheit.

33. The method of claim 26 further comprising the step of applying pressure to the mixture in the range of about 10 p.s.i. to about 40 p.s.i. with a piston having a diameter smaller than an inner diameter of the sleeve.

34. A method of forming an integrated filter and sleeve assembly, comprising the steps of:

providing a nonporous sleeve;

providing a mixture of particulate filtration media and a thermoplastic binder;

filling the (a non-porous) sleeve with the mixture; and applying one of at least heat and pressure to the sleeve and the mixture to form a bond between adjacent particles of filtration media and to form a bond between an interior surface of the sleeve and particles of filtration media adjacent to the sleeve using only the binder to form the bond.

35. The method of claim 34 further comprising the step of mixing filtration media with a binder to form a mixture.

36. The method of claim 34 further comprising the step of forming the sleeve from a thermoplastic polymer.

37. The method of claim 36 further comprising the step of forming the sleeve from polypropylene.

38. The method of claim 36 further comprising the step of forming the sleeve by rolling a thermoplastic polymer sheet into a cylindrical shape with overlapping edges.

39. The method of claim 36 further comprising the step of forming the sleeve from a pre-formed thermoplastic polymer extrusion tube.

40. The method of claim 34 further comprising the step of forming the filtration media from carbon particles.

* * * * *

UNITED STATES PATENT AND TRADEMARK OFFICE
CERTIFICATE OF CORRECTION

PATENT NO. : 5,817,263
DATED : October 6, 1998
INVENTOR(S) : Roy M. Taylor

It is certified that error appears in the above-identified patent and that said Letters Patent is hereby corrected as shown below:

On the Title Page

In column 1, item [21], please change "704,939" to --08/704,939--.

Signed and Sealed this

Seventeenth Day of April, 2001

Attest:

NICHOLAS P. GODICI

Attesting Officer     Acting Director of the United States Patent and Trademark Office